Patented Sept. 14, 1926.

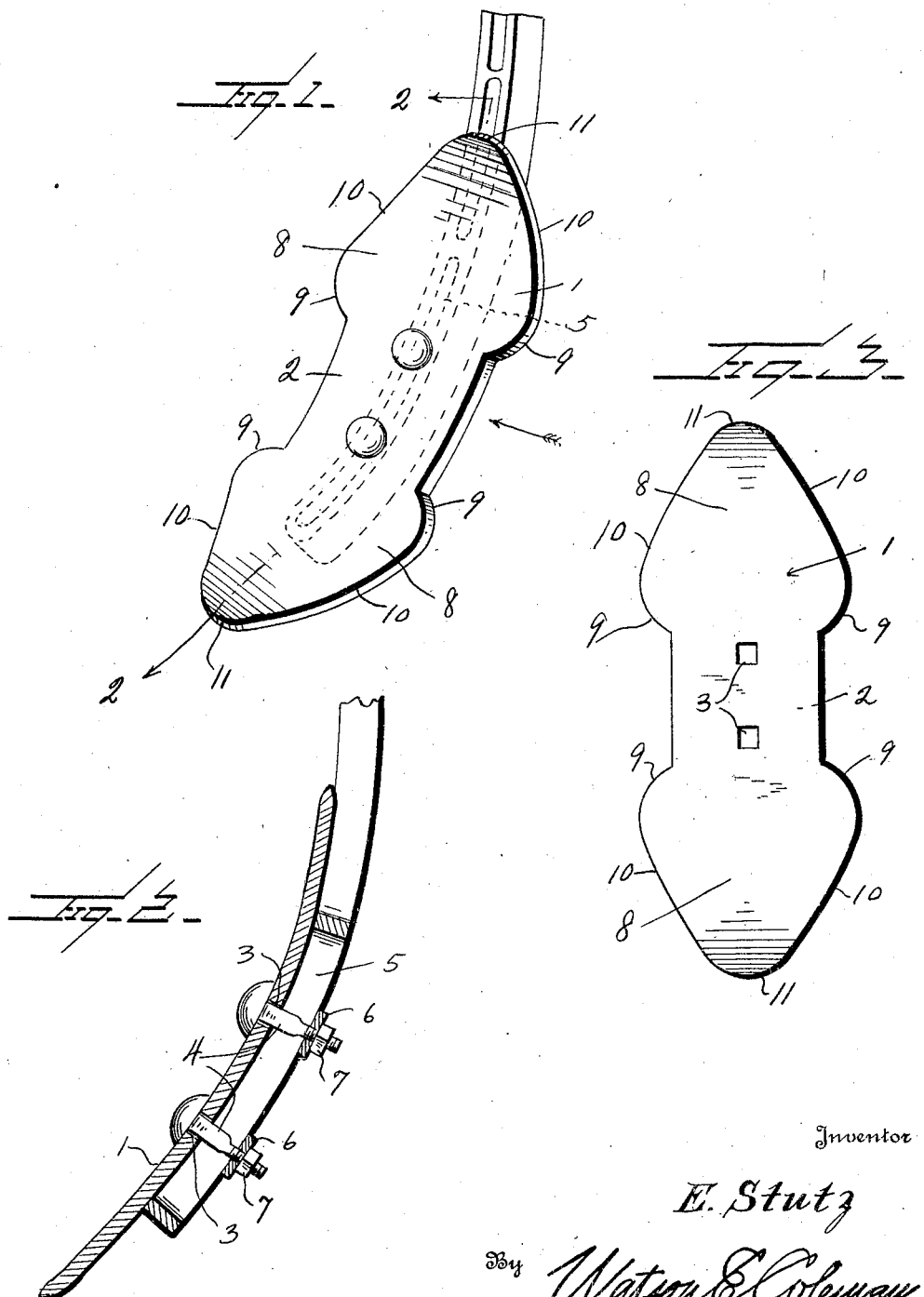

1,599,799

UNITED STATES PATENT OFFICE.

EUGENE STUTZ, OF FREDERICKSBURG, OHIO.

SHOVEL OR PLOW BLADE.

Application filed September 23, 1922. Serial No. 590,083.

The present invention has for its purpose the provision of a device of this kind, which is narrow at its central portion and has broad opposite ends, enabling the shovel to be reversed, so that either end of the shovel may be used to penetrate the soil.

Another purpose is the provision of a shovel having its opposite enlarged ends of arcuate form at points where the enlarged ends connect to the narrow portion and at the extremities, and between the extremities and where the first arcuate portions adjoin the narrow portion of the shovel. This construction of shovel is more durable than shovels wherein such corresponding portions are pointed, due to the fact that such points will wear off in a short time, and therefore be of no further benefit.

Still another purpose is to provide a shovel for use in connection with a plow shank or standard, and by which the soil as it is broken up may be more easily distributed, the narrow portion allowing the broken up soil to easily pass over the rounded or arcuate portions adjacent where the narrow portion merges into the enlarged portion, hence permitting more even distribution of the soil.

Since the shovel is of substantially uniform thickness throughout, the shovel will withstand considerable wear thereon, hence the shovel has been found to be more durable.

A further purpose is to provide a device of this kind, wherein the enlarged ends of the shovel have arcuate form edges, instead of sharpened points as in other shovels, thereby permitting the shovel to break and work up the ground more thoroughly.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawings and claimed.

In the drawings:—

Figure 1 is a view in perspective of the improved shovel or plow blade constructed in accordance with the invention, and showing the same as applied to a plow standard or shank;

Figure 2 is a sectional view on line 2—2 of Figure 1;

Figure 3 is a view in front elevation of the shovel or plow blade.

Referring to the drawings, 1 designates a shovel or plow blade as a whole, and which comprises a narrow portion 2, which has a pair of openings 3 of rectangular formation, for the reception of securing bolts 4. The shanks of these bolts are square or rectangular in cross section for the greater portion of their length, and are engaged through the slot 5 of the plow shank or standard. Obviously since the shanks of the bolts are square or rectangular in cross section and are engaged in the slot 5, the bolts are prevented from turning, hence the washer 6 and the nuts 7 will remain attached to the shanks, and thereby prevent the shovel or plow blade from detaching. The nuts 7 are threaded upon the reduced cylindrical portions of the shanks, and act to hold the washers or plates 6 against the rear edge of the plow shank or standard.

It will be noted that the shovel or plow blade is substantially of uniform thickness throughout its length and width, and is also curved or arcuate from one end to the opposite end, as shown in Figures 1 and 2.

The opposite ends of the plow blade or shovel are provided with enlargments or wings 8, and which have their edges as at 9 of arcuate form. These edge portions 9 project beyond the narrow portion 2 of the shovel or plow blade, and since the edge portions 10 (which merge into the edge portions 9) are curved or of arcuate form, the soil may be more easily broken or worked up as the shovel passes through the ground. Owing to this construction considerable more of the soil may be broken or worked up than with any other form of blade, wherein parts corresponding to the parts 9 and 10 are pointed, and wherein the edges such as 10 merge into a point. In the present instance, however, the edge portions 10 merge into a curved or arcuate extremity or edge portion 11, which together with the edge portions 9 and 10 will withstand more wear than if these portions are sharpened.

The invention having been set forth, what is claimed is:—

A doubled-ended reversible shovel blade curved longitudinally to conform to the concave side of a standard, the central portion of said blade being provided with longitudinally spaced openings to provide means for attaching the same to such standard, each end of the blade being formed into a point, the side marginal portion of the blade immediately adjacent to each point being provided with an outstanding wing, the outer edge of which being arcuate and being in continuity with the edge of the adjacent point, said blade being of substantially the same thickness at all points.

In testimony whereof I hereunto affix my signature.

EUGENE STUTZ.